United States Patent [19]
Perez

[11] Patent Number: 5,887,464
[45] Date of Patent: Mar. 30, 1999

[54] AUTOMOBILE ANTI-THEFT DEVICE

[76] Inventor: Angel Perez, 198 S. 1st St., Apt. 2D, Brookly, N.Y. 11211

[21] Appl. No.: 50,876

[22] Filed: Mar. 31, 1998

[51] Int. Cl.$^6$ .................................................. B60R 25/02
[52] U.S. Cl. ............................................. 70/209; 70/226
[58] Field of Search ............................ 70/209, 211, 212, 70/225, 226, 237, 238

[56] References Cited

U.S. PATENT DOCUMENTS

| | | | |
|---|---|---|---|
| 5,197,308 | 3/1993 | Pazik | 70/209 |
| 5,259,222 | 11/1993 | Jang | 70/238 X |
| 5,299,438 | 4/1994 | Chen | 70/226 X |
| 5,435,158 | 7/1995 | Ta-Yung | 70/226 X |
| 5,636,538 | 6/1997 | Openiano | 70/226 X |
| 5,713,229 | 2/1998 | Garcia et al. | 70/237 X |
| 5,765,415 | 6/1998 | Savinsky | 70/226 X |
| 5,778,709 | 7/1998 | Hsu | 70/238 X |

Primary Examiner—Lloyd A. Gall

[57] ABSTRACT

An automobile anti-theft device comprised of an outer three prong portion having two outer prongs and a center prong. The outer prongs have a lower portion of a curvilinear portion secured thereto thereby forming a U-shape. The center prong is secured to a midpoint of a top surface of the curvilinear portion. The center prong has an engagement rod extending outwardly therefrom. The device contains an inner three prong portion having two outer prongs and a center prong. The outer prongs have a lower portion of a curvilinear portion secured thereto thereby forming a U-shape. The center prong is secured to a midpoint of a top surface of the curvilinear portion. The center prong has a locking member therein. The locking member includes an engageable locking pawl. The prongs of inner three prong portion adjustably secure to the prongs of the outer three prong portion with the engageable locking pawl selectively engaging the engagement rod of the center prong of the outer three prong portion to secure the inner three prong portion and the outer three prong portion around the steering wheel.

6 Claims, 4 Drawing Sheets

PRIOR ART

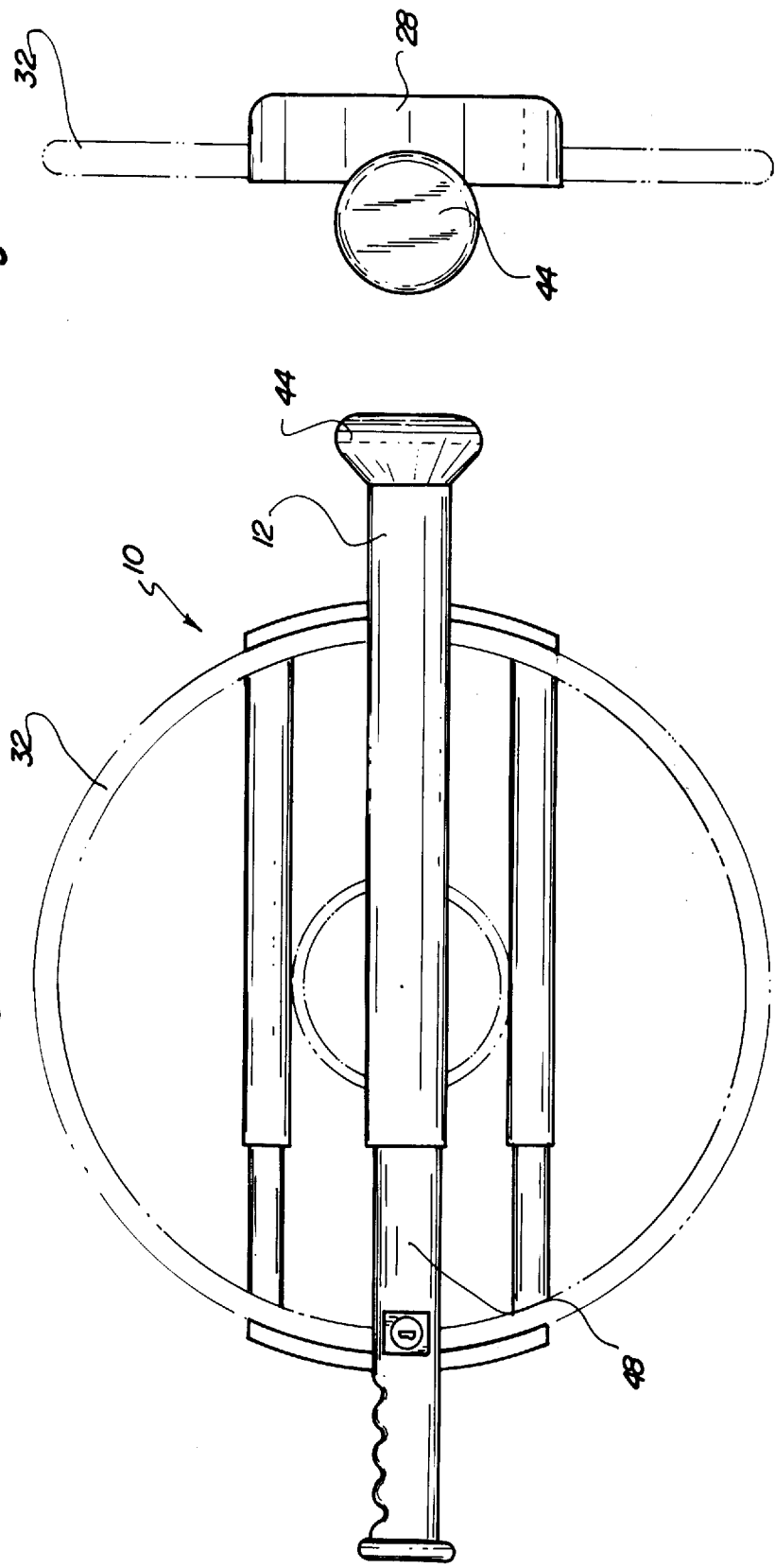

AUTOMOBILE ANTI-THEFT DEVICE

BACKGROUND OF THE INVENTION

1. Field of the Invention

The present invention relates to an automobile anti-theft device and more particularly pertains to preventing a car's steering wheel from being turned and from being sawed off with a automobile anti-theft device.

2. Description of the Prior Art

The use of anti-theft devices is known in the prior art. More specifically, anti-theft devices heretofore devised and utilized for the purpose of preventing auto theft are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,239,849 to Gallardo discloses an automobile and property anti-theft apparatus.

U.S. Pat. No. 5,168,732 to Chen et al. discloses an automobile steering lock.

U.S. Pat. No. 5,115,652 to Starmer discloses a motor vehicle anti-theft device.

U.S. Pat. No. 5,055,823 to Fuller discloses a portable anti-theft alarm and locking device for vehicles.

U.S. Pat. No. 5,007,259 to Mellard discloses an automobile anti-theft device.

While these devices fulfill their respective, particular objective and requirements, the aforementioned patents do not describe an automobile anti-theft device for preventing a car's steering wheel from being turned and from being sawed off.

In this respect, the automobile anti-theft device according to the present invention substantially departs from the conventional concepts and designs of the prior art, and in doing so provides an apparatus primarily developed for the purpose of preventing a car's steering wheel from being turned and from being sawed off.

Therefore, it can be appreciated that there exists a continuing need for a new and improved automobile anti-theft device which can be used for preventing a car's steering wheel from being turned and from being sawed off. In this regard, the present invention substantially fulfills this need.

SUMMARY OF THE INVENTION

In the view of the foregoing disadvantages inherent in the known types of anti-theft devices now present in the prior art, the present invention provides an improved automobile anti-theft device. As such, the general purpose of the present invention, which will be described subsequently in greater detail, is to provide a new and improved automobile anti-theft device and method which has all the advantages of the prior art and none of the disadvantages.

To attain this, the present invention essentially comprises an outer three prong portion having an upper prong, a lower prong, and a center prong. The upper prong has an open first end and a closed second end. The lower prong has an open first end and a closed second end. The closed second end of the upper prong and the closed second end of the lower prong have a lower portion of a curvilinear portion secured thereto thereby forming a U-shape. The curvilinear portion has a lower lip portion for engaging a lower portion of a steering wheel. The center prong has an open first end and an open second end. The center prong is secured to a midpoint of a top surface of the curvilinear portion inward of the open second end of the center prong. The center prong has an engagement rod extending outwardly of the open first end. The engagement rod has a plurality of engagement members along an extent thereof. A rubber knob is securable within the open second end of the center prong of the outer three prong portion. The device contains an inner three prong portion having an upper prong, a lower prong, and a center prong. The upper prong has a first end and a second end. The lower prong has a first end and a second end. The second end of the upper prong and the second end of the lower prong have a lower portion of a curvilinear portion secured thereto thereby forming a U-shape. The curvilinear portion has a lower lip portion for engaging a lower portion of a steering wheel. The center prong has an open first end and a closed second end. The center prong is secured to a midpoint of a top surface of the curvilinear portion inward of the closed second end of the center prong. The center prong has a hand grip inwardly of the closed second end. The center prong has a locking member therein. The locking member includes an engageable locking pawl. The inner three prong portion adjustably secure to the outer three prong portion with the engageable locking pawl selectively engaging the engagement members of the engagement rod of the center prong of the outer three prong portion to secure the inner three prong portion and the outer three prong portion around the steering wheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile anti-theft device which has all the advantages of the prior art anti-theft devices and none of the disadvantages.

It is another object of the present invention to provide a new and improved automobile anti-theft device which may be easily and efficiently manufactured and marketed.

It is a further object of the present invention to provide a new and improved automobile anti-theft device which is of durable and reliable construction.

An even further object of the present invention is to provide a new and improved automobile anti-theft device which is susceptible of a low cost of manufacture with regard to both materials and labor, and which accordingly is then susceptible of low prices of sale to the consuming public, thereby making such a automobile anti-theft device economically available to the buying public.

Still yet another object of the present invention is to provide a new and improved automobile anti-theft device which provides in the apparatuses and methods of the prior art some of the advantages thereof, while simultaneously overcoming some of the disadvantages normally associated therewith.

Even still another object of the present invention is to provide a new and improved automobile anti-theft device for preventing a car's steering wheel from being turned and from being sawed off.

Lastly, it is an object of the present invention to provide a new and improved automobile anti-theft device comprised of an outer three prong portion having two outer prongs and a center prong. The outer prongs have a lower portion of a curvilinear portion secured thereto thereby forming a U-shape. The center prong is secured to a midpoint of a top surface of the curvilinear portion. The center prong has an engagement rod extending outwardly therefrom. The device contains an inner three prong portion having two outer prongs and a center prong. The outer prongs have a lower portion of a curvilinear portion secured thereto thereby forming a U-shape. The center prong is secured to a midpoint of a top surface of the curvilinear portion. The center prong has a locking member therein. The locking member includes an engageable locking pawl. The prongs of inner three prong portion adjustably secure to the prongs of the outer three prong portion with the engageable locking pawl selectively engaging the engagement rod of the center prong of the outer three prong portion to secure the inner three prong portion and the outer three prong portion around the steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. dr

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of the preferred embodiment of the automobile anti-theft device constructed in accordance with the principles of the present invention.

FIG. 4 is a side elevation view of the present invention.

The same reference numerals refer to the same parts through the various Figures.

DESCRIPTION OF THE PREFERRED EMBODIMENT

Figure 1:
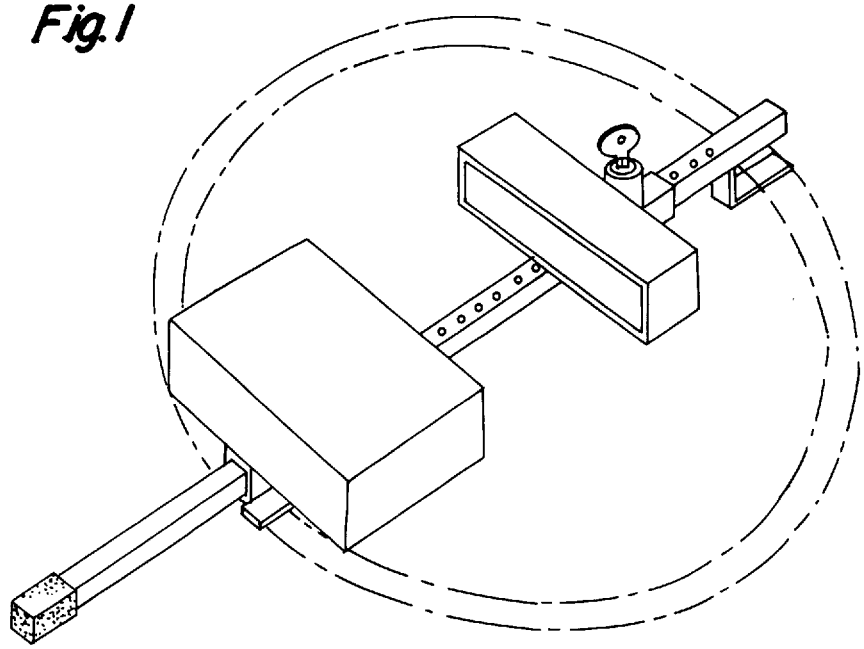
FIG. 1 is a perspective view of the prior art automobile and property anti-theft apparatus.
Figure 2:
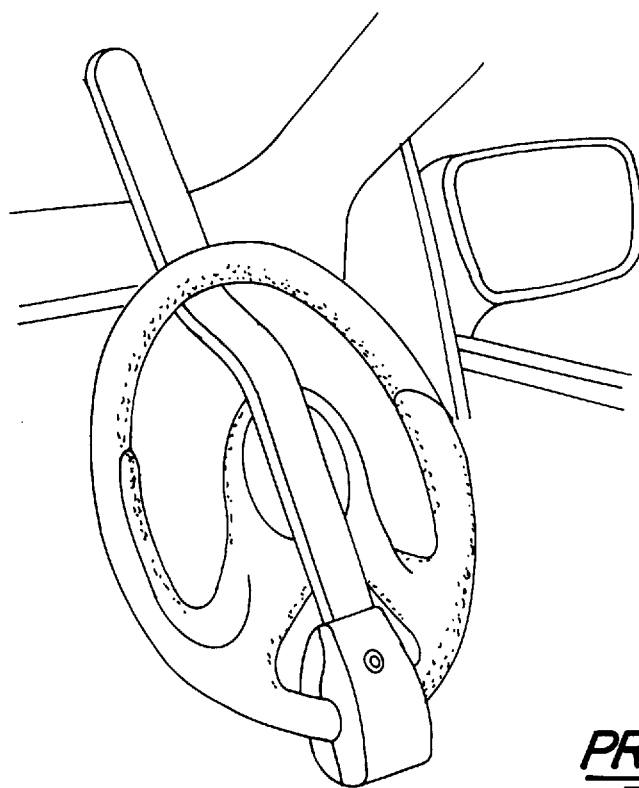
FIG. 2 is a perspective view of the prior art motor vehicle anti-theft device.
Figure 5:
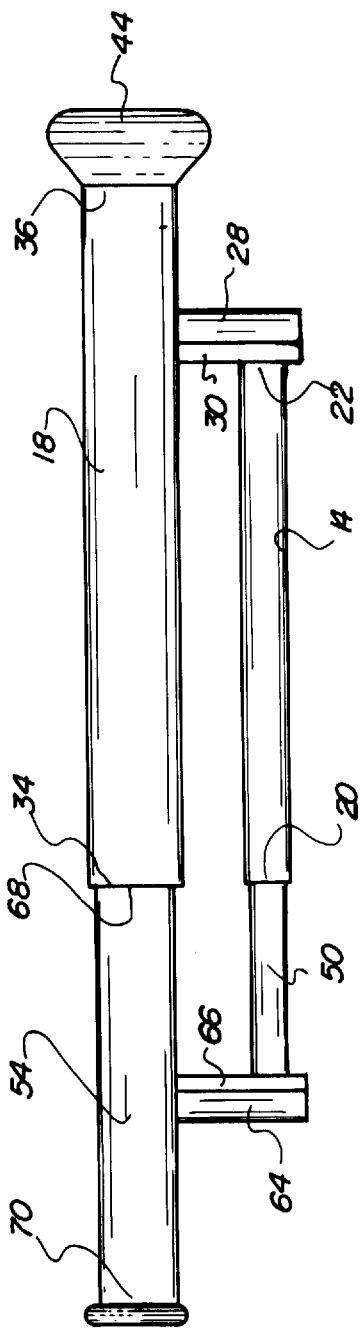
FIG. 5 is a plan view of the preferred embodiment of the present invention.
Figure 6:
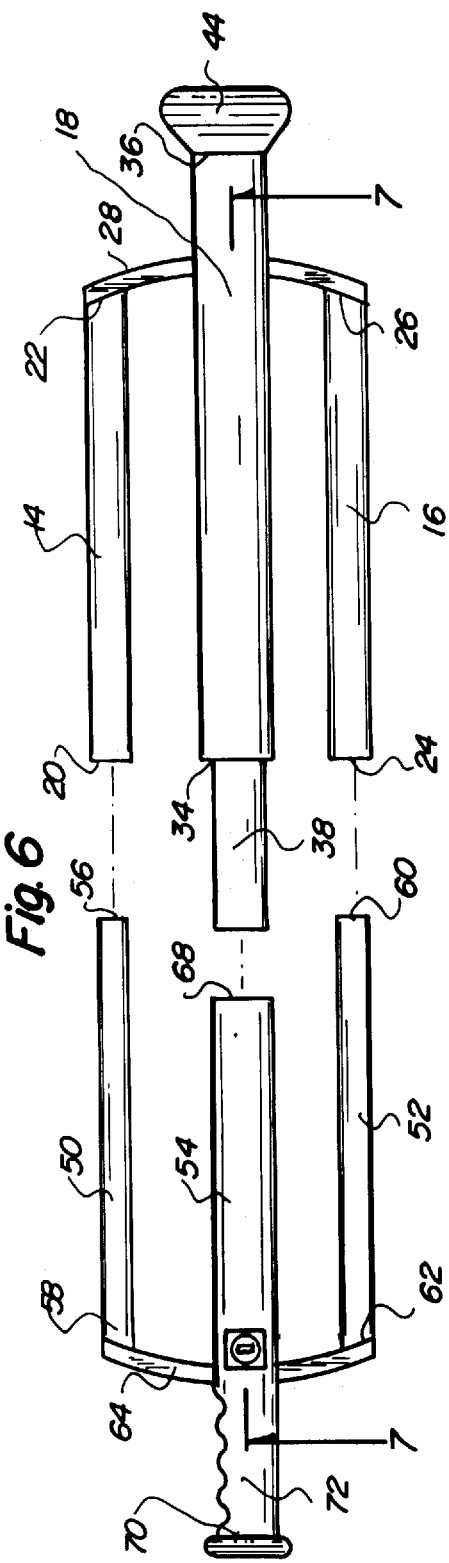
FIG. 6 s a front elevation view of the present invention in an unlocked configuration.
Figure 7:
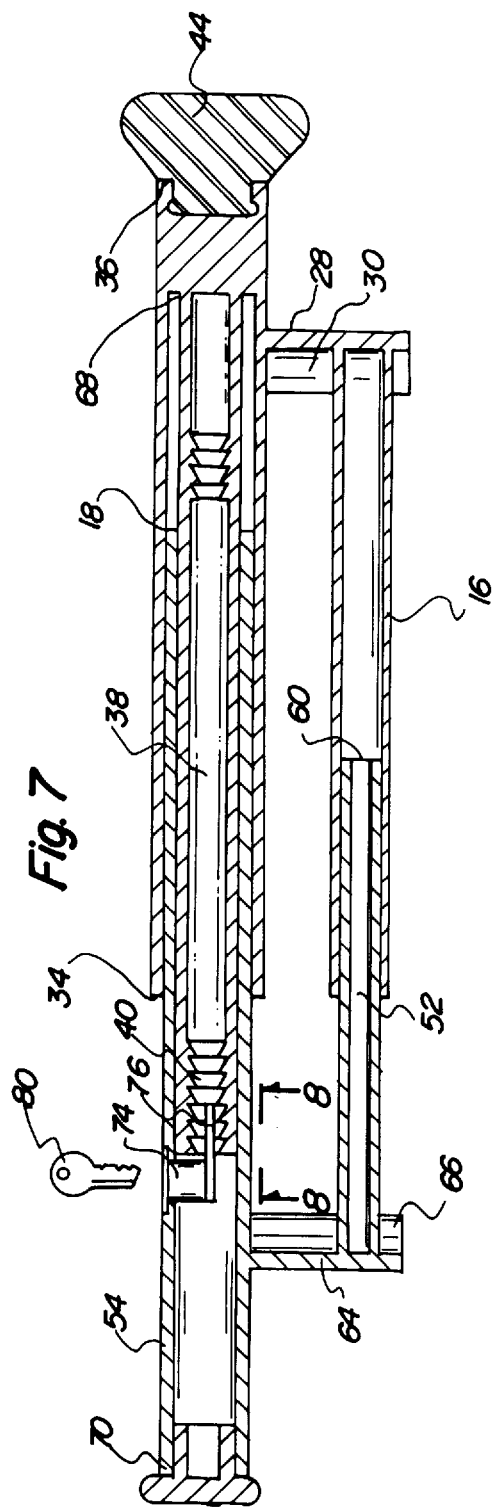
FIG. 7 is a cross-sectional view as taken along line 7—7 of FIG. 6.
Figure 8:
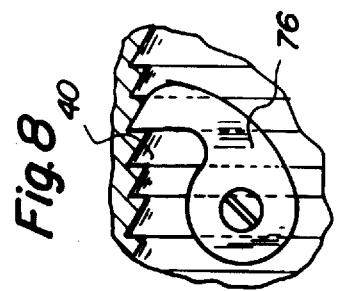
FIG. 8 is a cross-sectional view as taken along line 8—8 of FIG. 7.

With reference now to the drawings, and in particular, to FIGS. 3–8 thereof, the preferred embodiment of the new and improved automobile anti-theft device embodying the principles and concepts of the present invention and generally designated by the reference number 10 will be described.

Specifically, it will be noted in the various Figures that the device relates to a new and improved automobile anti-theft device for preventing a car's steering wheel from being turned and from being sawed off. In its broadest context, the device consists of an outer three prong portion, a rubber knob, an inner three prong portion, and a key.

The device 10 contains an outer three prong portion 12 having an upper prong 14, a lower prong 16, and a center prong 18. The upper prong 14 has an open first end 20 and a closed second end 22. The lower prong 16 has an open first end 24 and a closed second end 26. The closed second end 22 of the upper prong 14 and the closed second end 26 of the lower prong 16 have a lower portion of a curvilinear portion 28 secured thereto thereby forming a U-shape. The curvilinear portion 28 has a lower lip 30 portion for engaging a lower portion of a steering wheel 32. The center prong 18 has an open first end 34 and an open second end 36. The center prong 18 is secured to a midpoint of a top surface of the curvilinear portion 28 inward of the open second end 36 of the center prong 18. The center prong 18 has an engagement rod 38 extending outwardly of the open first end 34. The engagement rod 38 has a plurality of engagement members 40 along an extent thereof. The plurality of engagement members 40 allow for the device 10 to be adjusted to fit any sized steering wheel 32 for a variety of vehicles, such as cars, trucks, and recreational vehicles.

A rubber knob 44 is securable within the open second end 36 of the center prong 18 of the outer three prong portion 12. When the device 10 is in place around the steering wheel 32, the rubber knob 44 is positioned under the vehicle's dashboard or windshield, thus protecting the dashboard or windshield from any damage that would be caused by the outer three prong portion 12.

The device 10 contains an inner three prong portion 48 having an upper prong 50, a lower prong 52, and a center prong 54. The upper prong 50 has a first end 56 and a second end 58. The lower prong 52 has a first end 60 and a second end 62. The second end 58 of the upper prong 50 and the second end 62 of the lower prong 52 have a lower portion of a curvilinear portion 64 secured thereto thereby forming a U-shape. The curvilinear portion 64 has a lower lip portion 66 for engaging a lower portion of the steering wheel 32. The center prong 54 has an open first end 68 and a closed second end 70. The center prong 54 is secured to a midpoint of a top surface of the curvilinear portion 64 inward of the closed second end 70 of the center prong 54. The center prong 54 has a hand grip 72 inwardly of the closed second end 70. The center prong 54 has a locking member 74 therein. The locking member 74 includes an engageable locking pawl 76. The inner three prong portion 48 is adjustably secured to the outer three prong portion 12 with the engageable locking pawl 76 selectively engaging the engagement members 40 of the engagement rod 38 of the center prong 18 of the outer three prong portion 12 to secure the inner three prong portion 48 and the outer three prong portion 12 around the steering wheel 32. When the device 10 is in place around the steering wheel 32, the center prong 54 is positioned over the steering wheel 32, while the upper prong 50 and the lower prong 52 are positioned under the steering wheel. The upper prong 50 and the lower prong 52 are received within the respective open first ends 20,24 of the upper prong 14 and lower prong 16 of the outer three prong portion when the device 10 is engaged around the steering wheel 32. By appearance, the inner three prong portion 48 is smaller diametrically than the outer three prong portion 12.

The device 10 contains a key 80. The key 80 selectively locks or unlocks the engageable locking pawl 76 of the locking member 74 of the inner three prong portion 48 in relation to the engagement members 40 of the engagement rod 38 of the center prong 18 of the outer three prong portion 12. Once the device 10 is placed on the steering wheel 32, it not only prevents theft of the automobile, but with it's specific design, also prevents a thief from dislodging a protective air bag from the steering wheel 32 thus providing extra protection that other anti-theft devices do not provide.

The present invention is an anti-theft device for vehicles. It consists of two three-pronged fork-like pieces. The larger of the two forks is made of hollow tubes. The center prong is a long tube with a baseball bat-shaped handle at its end. The two outer tubes form a U-shape and are welded beneath the center tube to form the fork. The smaller fork is made of solid bars. The center bar is welded on top of the U-shape that is formed by the two outer bars. It has a key slot for locking the two forks in place when they are placed over a steering wheel and there is a hand grip at its outer end.

When assembled together over a steering wheel, the smaller fork's prongs are inserted into the larger fork's hollow prongs. They are adjusted in and out to fit the size of the steering wheel and lock it in place. The two outside prongs on the assembled guard fit under the steering wheel and the inside prong fits over the top of the steering wheel, thus preventing the wheel from being turned. It also prevents the steering wheel from being sawed or cut off. Because it is adjustable, the present invention can be used on cars, trucks, vans, and recreational vehicles.

The present invention is a tough and effective anti-theft device, that could prevent a vehicle from being stolen. It is designed to appeal to a car, truck, and RV owners who wish to protect their vehicle from thieves.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An automobile anti-theft device for preventing a car's steering wheel from being turned and from being sawed off comprising, in combination:

an outer three prong portion having an upper prong, a lower prong, and a center prong, the upper prong having an open first end and a closed second end, the lower prong having an open first end and a closed second end, the closed second end of the upper prong and the closed second end of the lower prong having a lower portion of a curvilinear portion secured thereto thereby forming a U-shape, the curvilinear portion having a lower lip portion for engaging a lower portion of a steering wheel, the center prong having an open first end and an open second end, the center prong secured to a midpoint of a top surface of the curvilinear portion inward of the open second end of the center prong, the center prong having an engagement rod extending outwardly of the open first end, the engagement rod having a plurality of engagement members along an extent thereof;

a rubber knob securable within the open second end of the center prong of the outer three prong portion;

an inner three prong portion having an upper prong, a lower prong, and a center prong, the upper prong having a first end and a second end, the lower prong having a first end and a second end, the second end of the upper prong and the second end of the lower prong having a lower portion of a curvilinear portion secured thereto thereby forming a U-shape, the curvilinear portion having a lower lip portion for engaging a lower portion of a steering wheel, the center prong having an open first end and a closed second end, the center prong secured to a midpoint of a top surface of the curvilinear portion inward of the closed second end of the center prong, the center prong having a hand grip inwardly of the closed second end, the center prong having a locking member therein, the locking member including an engageable locking pawl, the inner three prong portion adjustably securing to the outer three prong portion with the engageable locking pawl selectively engaging the engagement members of the engagement rod of the center prong of the outer three prong portion to secure the inner three prong portion and the outer three prong portion around the steering wheel;

a key, the key selectively locking or unlocking the engageable locking pawl of the locking member of the inner three prong portion in relation to the engagement members of the engagement rod of the center prong of the outer three prong portion.

2. An automobile anti-theft device for preventing a car's steering wheel from being turned and from being sawed off comprising, in combination:

an outer three prong portion having two outer prongs and a center prong, the outer prongs having a lower portion of a curvilinear portion secured thereto thereby forming a U-shape, the center prong secured to a midpoint of a top surface of the curvilinear portion, the center prong having an engagement rod extending outwardly therefrom;

an inner three prong portion having two outer prongs and a center prong, the outer prongs having a lower portion of a curvilinear portion secured thereto thereby forming a U-shape, the center prong secured to a midpoint of a top surface of the curvilinear portion, the center prong having a locking member therein, the locking member including an engageable locking pawl, the prongs of inner three prong portion adjustably securing to the prongs of the outer three prong portion with the engageable locking pawl selectively engaging the engagement rod of the center prong of the outer three prong portion to secure the inner three prong portion and the outer three prong portion around the steering wheel.

3. The device as described in claim 2 and further including a key, the key selectively locking or unlocking the engageable locking pawl of the locking member of the inner three prong portion in relation to the engagement rod of the center prong of the outer three prong portion.

4. The device as described in claim 3 and further including a rubber knob securable within an open end portion of the center prong of the outer three prong portion.

5. The device as described in claim 4 and further including wherein the curvilinear portions of the outer three prong portion and the inner three prong portion having a lower lip portion for engaging a lower portion of a steering wheel.

6. The device as described in claim 5 and further including wherein the center prong of the outer three prong portion having a hand grip on an end portion thereof.

* * * * *